UNITED STATES PATENT OFFICE.

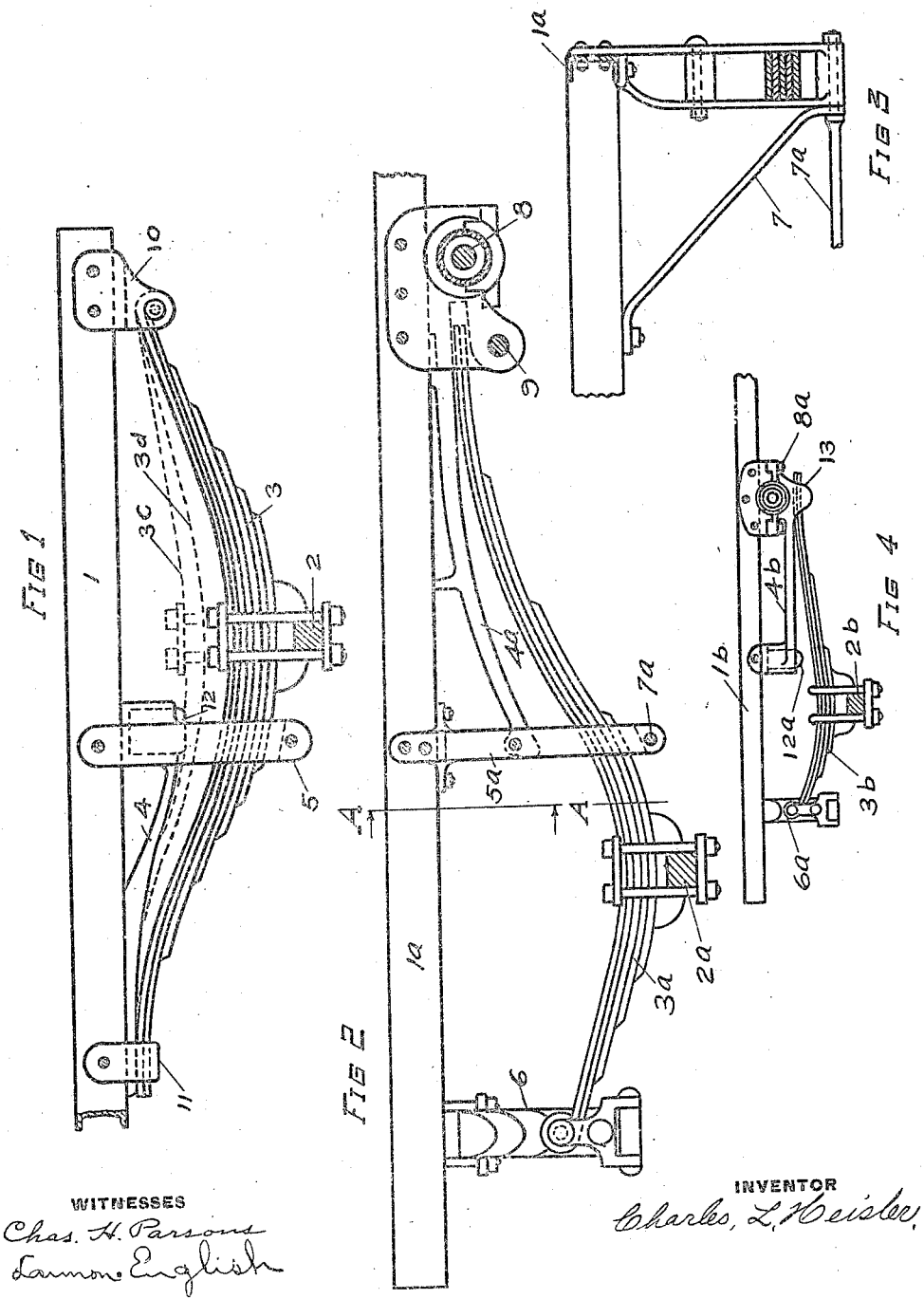

CHARLES L. HEISLER, OF SCHENECTADY, NEW YORK.

MOTOR-VEHICLE SPRING-MOUNTING.

1,155,062.  Specification of Letters Patent.  Patented Sept. 28, 1915.

Application filed January 9, 1912. Serial No. 670,172.

*To all whom it may concern:*

Be it known that I, CHARLES L. HEISLER, a citizen of the United States, and a resident of Schenectady, in the State of New York, have invented certain new and useful Improvements on Motor-Vehicle Spring-Mountings, of which the following is a specification.

My invention relates more particularly to large motor trucks or other heavy vehicles, or trucks, on which non-pneumatic tires, and comparatively heavy springs are used for supporting heavy loads when hauled over rough roads and uneven surfaces.

The primary object is to provide a truck spring sufficiently strong to safely carry heavy freight, or lading, over rough roads, and means that will automatically increase the length and resilience of the springs, to compensate for any material reduction in load, or when the truck is run empty. Also to provide a means whereby injury to the springs is prevented from overloads. Furthermore to reduce the tendency to side swaying.

In the drawings, Figure 1, illustrates a semi-elliptic spring, mounted upon the device and attached to a truck frame. Fig. 2, illustrates a platform spring and the device attached to a motor driven truck. Fig. 3, is a section at A A of Fig. 2. Fig. 4, is another application of the device on a motor truck.

In the drawings, 1, 1$^a$ and 1$^b$, represent a truck frame of usual construction, 2, 2$^a$ and 2$^b$, the axle; 3, 3$^a$ and 3$^b$, semi-elliptic main springs which are of usual construction excepting, as shown, one end is considerably longer than the other. Excessive or destructive deflection of the longer end being prevented by the flexure limit member 4, 4$^a$ and 4$^b$, that is; when the spring is flexed to its extreme position indicated by the dotted lines 3$^c$, Fig. 1, then the safe spring loading cannot be exceeded and the spring material is not strained beyond its safe working limit. Evidently the members 4 or 4$^a$, will transmit the load direct from the frame by means of the stirrup 5, or 5$^a$. When the main spring is deflected to the line 3$^d$, Fig. 1, then its resistance is materially increased, and with a corresponding reduction in resilience, it will carry a heavy load with safety.

The cross springs 6, 6$^a$, Figs. 2 and 4, are of usual construction, and are connected at their opposite ends to a duplicate of the spring 3$^a$ or 3$^b$, and which is mounted in precisely the same manner.

It will be noted that the distance from the axle, 2, 2$^a$ or 2$^b$, to the point of contact with the limit member, 4 or, 4$^a$, or 4$^b$ becomes less and less as the load and corresponding spring flexure increases; consequently as this leverage decreases it also proportionately reduces the stresses in the shorter end of the main spring, 3, 3$^a$, or 3$^b$, (as well as in the cross spring 6, or 6$^a$, in Figs. 2 and 4 although the length of this cross-spring has not been changed) nor the shorter ends of the semi-elliptic springs 3, 3$^a$, or 3$^b$.

The spring guiding stirrup 5$^a$ is shown to be supported laterally by suitable stays 7 and 7$^a$, which resist side movements of the main spring when the vehicle is swaying sidewise as on an incline, or when it comes against a curb.

In Fig. 2, the member 4$^a$, is shown attached to the bracket that forms the usual sprocket chain pinion bearing 8, and the radius bar eye 9. In Fig. 1, the bracket 10 pivotally secures the spring end of the frame 1. The other end is slightly fitted in the member 11 at the end of the flexure limit member 4.

It will be seen that the lower closed end of the stirrups 5, or 5$^a$, prevent excessive downward deflection of the springs.

The cushion bumpers 12, and 12$^a$, are placed at the end of the limit member 4, or 4$^b$, as shown, to avoid sudden bumps when the vehicle sways sidewise, or when passing over an obstruction, by causing the spring deflection wave to gradually approach the cushion as it follows from the end of the spring along the flexure limit member to the cushion. The latter can be made of rubber, or spring steel. From the drawings it will be noted that even after the main springs 3, or 3$^b$, rest against the end of the limit member 4$^a$; the cushion 12, or 12$^a$; the short ends, (3, 3$^a$ and 3$^b$) and the cross springs 6, or 6$^a$, still carry a portion of the load, and consequently give it resilience or cushioning. This is true because the cushion 12, or 12$^a$, is at some horizontal distance from the axle 2, or 2$^b$, which forms the fulcrum. Heretofore the cushion 12, or 12$^a$, was usually placed directly over the axle and then practically cut out the spring 6$^a$ in Fig. 4, or the short end of 3, Fig. 1.

Fig. 4, shows the spring 3$^b$, with an extended end, that projects beyond and under the bearing 8$^a$. The long ends of all the semi-elliptic main springs are shown to be slidingly fitted, as in Fig. 1, the ends in Figs. 2 and 3, are slidingly fitted in the brackets 8, or 8$^a$. In Fig. 4, the flexure limit member 4$^b$, forms a socket for the cushion 12$^a$, at one end, and a bearing cap and sliding spring bearing 13, at the other.

The flexure limit member does not reach the vertical plane of the axle, this is for the purpose of preventing cutting out all the spring action, and to give the cross spring, and the short end of the semi-elliptic main springs all the necessary leverage to prevent excessive straining under a maximum load or deflection. Thereby the device avoids the non-resilient bumps or shocks so common to spring bumpers generally used. In this device there is always a spring cushion between the axle and frame, as the parts can never come together "solid" or "dead."

The several drawings show that a plurality of flexible bars or levers comprising each main spring, extend under each safe flexure member for a major portion of its length, thereby preventing the bars or leaves from being flexed beyond their safe limits.

Claims:

1. The combination with an axle and a vehicle supported thereby, of a main spring comprising a long and short end section formed of a plurality of flat flexible spring leaves, a vehicle frame, means for coupling the spring to said frame, and a safe flexure limit member attached to said vehicle and adapted to engage the long section of the spring and aid the spring in giving an increasing resistance to support a corresponding increase of load, to cause the spring to bend gradually under load and remain within its safe flexure limits.

2. The combination with an axle and a vehicle supported thereby, of a main spring comprising a long and short end section formed of a plurality of flat flexible spring leaves, a vehicle frame, means for coupling the spring to said frame, a safe flexure limit member attached to said vehicle and adapted to engage the long section of the spring and aid the spring in giving an increasing resistance to support a corresponding increase of load, to cause the spring to bend gradually under load and remain within its safe flexure limits; and means adapted to attach the axle to said spring at a point between the long and short end sections thereof.

3. The combination with an axle and a vehicle supported thereby, of a flat leaf spring attached near its middle to the axle, of a main-frame mounted upon the spring, and connected thereto; a safe flexure limit member attached to said vehicle, and arranged to prevent unsafe and excessive flexure of the spring, and which will cause it to gradually bend to a form pre-determined by said limit member and with an increasing resistance which opposes a corresponding increase of load, a cushion bumper attached to said vehicle, and arranged at some distance horizontally from said axle in a manner to cause the remaining portion of the spring, that is not in contact with the limit member, to resiliently carry the extreme maximum load with safety, because of the advantageous leverage given to the spring by the location of said bumper.

4. The combination, with an axle and a vehicle supported thereby, of a main spring comprising a long and short end section formed by a plurality of flat flexible spring leaves, a vehicle frame attached to and supported by said spring, means for coupling the spring to the frame, a safe flexure limit member attached to said vehicle and adapted to engage with the long end section of the main spring and aid it in giving an increasing resistance to support a corresponding increase of load, and to cause the spring to bend gradually under load and remain within its safe flexure limits, the opposite short end section of the main spring being formed and adapted to engage with said means for coupling, and a plurality of flat flexible spring leaves forming the long end section extending under the limit member for a major portion of said long end section's length.

5. The combination, with an axle and a vehicle supported thereby, of a main spring, comprising a long and short end section formed of a plurality of flat flexible spring leaves, means for attaching the main spring to an axle between said sections, a vehicle frame mounted upon the spring and connected thereto; a safe flexure limit member attached to said vehicle and engaging with the long end section of the spring, a cross-spring coupled to the opposite, short end section, of the main spring with the axle interposed between the cross spring and said flexure limit member, and means for attaching said cross spring to the vehicle frame.

6. The combination, with an axle and a vehicle supported thereby, of a main spring, comprising a long and short end section formed of a plurality of flat flexible spring leaves, a vehicle frame attached to and supported by said spring, means for coupling the spring to the frame, a safe flexure limit member attached to said vehicle and adapted to engage with the long end section of the main spring and aid the spring in giving an increasing resistance to support a corresponding increase of load, and to cause this long end section of the spring to bend gradually under load and remain within its safe flexure limits, which corresponds to a form pre-determined by the contour of the spring contact surface of said limit member, and a spring guiding stirrup embracing said main spring and adapted to engage with and support said flexure limit member.

7. The combination, with an axle and a vehicle supported thereby, of a main spring, comprising a long and short end section formed of a plurality of flat flexible spring leaves, of a vehicle frame attached to and supported by said spring, a safe flexure limit member attached to said vehicle and engaging with said main spring at the long end section thereof, means for coupling the opposite ends of said spring to the vehicle, and frame brackets engaging the limit member and main spring for the purpose of connecting said spring to the vehicle frame.

8. The combination with an axle and a vehicle supported thereby, of a main spring comprising a long and short end section, means for attaching the axle thereto, a vehicle frame, means for coupling the frame to the spring, and means interposed between said long spring section and the frame and arranged to prevent excessive stress in the short end section.

CHARLES L. HEISLER.

Witnesses:
L. MAE HEISLER,
CHARLES L. HEISLER, Jr